United States Patent [19]
Fischer et al.

[11] Patent Number: 5,642,221
[45] Date of Patent: Jun. 24, 1997

[54] HEAD MOUNTED DISPLAY SYSTEM

[75] Inventors: Robert E. Fischer; L. Milton Lee, both of Westlake Village; Karl H. Roth, Los Angeles, all of Calif.

[73] Assignee: Optics 1, Inc., Westlake Village, Calif.

[21] Appl. No.: 207,604

[22] Filed: Mar. 9, 1994

[51] Int. Cl.[6] .................................................. G02B 27/22
[52] U.S. Cl. .......................... 359/477; 345/8; 348/53; 351/158; 2/422
[58] Field of Search .......................... 359/13, 14, 462, 359/466, 471, 475, 477, 630, 632, 771, 772, 773, 775, 781, 782, 815, 816; 345/7–9; 348/115, 838, 53; 351/158, 118; 2/6.2, 422

[56] References Cited

U.S. PATENT DOCUMENTS

| | | | |
|---|---|---|---|
| 3,471,213 | 10/1969 | Back . | |
| 3,516,735 | 6/1970 | Goodell | 359/773 |
| 4,361,384 | 11/1982 | Bosserman | 359/630 |
| 4,577,347 | 3/1986 | Connon . | |
| 4,706,117 | 11/1987 | Schoolman | 348/53 |
| 4,869,575 | 9/1989 | Kubik | 345/8 |
| 5,003,300 | 3/1991 | Wells | 345/8 |
| 5,091,719 | 2/1992 | Beamon, II | 345/8 |
| 5,153,569 | 10/1992 | Kawamura et al. | 345/8 |
| 5,162,828 | 11/1992 | Furness et al. | 353/122 |
| 5,189,512 | 2/1993 | Cameron et al. | 348/838 |
| 5,276,471 | 1/1994 | Yamauchi et al. | 351/153 |
| 5,278,999 | 1/1994 | Brown et al. | 2/209 |

OTHER PUBLICATIONS

Personal Viewing System Sales Brochure, Manufactured by 01.

*Primary Examiner*—Thong Nguyen
*Assistant Examiner*—Darren E. Schuberg
*Attorney, Agent, or Firm*—Fleshner & Kim

[57] ABSTRACT

A head-mounted display system for the viewing of video or other sources of imagery which comprises a mechanism allowing for a wide range of adjustments for presenting the display to the wearer. The head mounted display device is supported by a headband or other support structure with three independent adjustments giving the wearer a wide range of adjustment capability. One pivot adjustment is in a location in proximity with the ear, the other pivot adjustment is located in close proximity with the pupil of the eye, and a third adjustment allows for the display unit to be adjusted in or out from the wearers head so as to permit convenient use with glasses. The mechanism allows the display to be located within or outside the wearer's primary field of view by utilizing these multiple adjustment locations for the system. The display unit consists of viewing optics, fold mirrors, liquid crystal display devices, and a backlight unit. By folding the light inward to nearly co-located display devices, a single backlight unit can be used.

7 Claims, 4 Drawing Sheets

HEAD MOUNTED DISPLAY SYSTEM

BACKGROUND OF THE INVENTION

1. Field of the Invention

This invention relates to lightweight head-mounted display systems which can easily be adjusted for viewing imagery within or outside the wearer's primary field of view.

2. Background of the Related Art

Most head-mounted display systems direct the image into the eye with complex optics consisting of lenses, fold mirrors, and/or beamsplitter arrangements. For example, U. S. Pat. Nos. 3,923,370 and 4,761,056 teach of helmet mounted display systems comprising complex optical paths with several reflective optical components to allow the wearer to view a cathode ray tube (CRT). These systems are complex, heavy, expensive, and very restrictive to the wearer. These systems are typically helmet-mounted and are intended for military applications. The system described in U.S. Pat. No. 3,923,370 uses mirrors which need to be carefully mounted to a visor assembly. Also, this patent provides no provision to adjust the imagery out of the wearer's primary field of view. The system described in U.S. Pat. No. 4,761,056 uses a visor which must be integral to its optical system and requires multiple folding mirrors. Hence, the optics cannot be adjusted by a user.

U.S. Pat. Nos. 4,968,123 and 4,153,913 teach of helmet-mounted display systems which project the imagery being viewed into the eyes of the wearer using complex optical paths. The use of a fixed helmet of predefined geometry in the above referenced patents greatly restricts the range of adjustment to the wearer. Often complex relay lenses, fold mirrors, and prisms are used as well, which further complicate the system. In particular, U.S. Pat. No. 4,968,123 employs a complex real optical to direct an image into the wearer's eyes and has no provision to adjust the imagery out of the wearer's primary field of view. U.S. Pat. No. 4,153,913 similarly does not teach any such provision.

Other head-mounted display systems are worn by the user with a headband or similar mounting arrangement. For example, U. S. Pat. No. 5,189,512 teaches of a helmet integrated display where a CRT image is viewed by the wearer in one eye with an occlusion viewed by the other eye. U.S. Pat. No. 5,189,512 teaches a fixed display in front of the eye with the other eye viewing an occluding mask. This cannot provide an unobstructed field of view capability.

U.S. Pat. Nos. 4,869,575 and 5,153,569 teach of smaller head-mounted display systems mounted to the head via eyeglasses or similar arrangements. While these systems offer some degree of adjustment, they do not give the wearer a full range of adjustment capability, and the wearer is restricted to view the display as it is set up. For example, U.S. Pat. No. 4,869,575 teaches an eyeglass mounted display system with no adjustment capability.

Similarly U.S. Pat. No. 5,153,569 teaches a stationary display system with see through or direct viewing capability, but no adjustment to direct the imagery out of the wearer's primary field of view.

U.S. Pat. No. 5,003,300 teaches a head mounted display system which is more light weight and friendly to the wearer, and with some adjustment capability. However, U.S. Pat. No. 5,003,300 does not provide any means of keeping the video imagery within the wearer's eye pupil as the unit is rotated upward or downward only about a rear pivot. In addition, U.S. Pat. No. 5,003,300 teaches only a display with independently illuminated light emitting elements. Also, U.S. Pat. No. 5,003,300 teaches a scanning means of presenting a raster image of the light emitting elements.

Finally, viewing optics in the above systems typically involve the use of two closely spaced cemented doublet achromatic lenses in order to reduce aberrations of imagery. Such lens systems always require at least three different radii of curvature in order to correct the optical aberrations. When air spaced achromatic doublets are used, they almost always use all 4 radii of curvature to reduce the residual aberrations. This large number of radii of curvature results in complicated and expensive imaging optics and hence makes the head-mounted display system more complicated and expensive.

SUMMARY OF THE INVENTION

An object of the invention, therefore is to provide a head-mounted display system for viewing video or other forms of visual information which is light weight and provides a wide range of adjustments to the wearer.

Another object of the invention is to provide a head-mounted display which utilizes simplified and inexpensive optics while minimizing or eliminating aberrations.

Another object of the invention is to provide a lightweight head mounted display which offers the wearer a full range of adjustments so that displayed imagery can be located at any desired location with respect to the wearer's primary visual field of view.

Another object of the invention is to provide a head-mounted display which is fully compatible for users with glasses and/or differing head sizes or shapes.

Another object of the invention is that it utilizes simplified optics and yet minimizes aberrations.

It is a further object of this invention to provide a light-weight head-mounted display system using compact viewing optics so as to give the user high quality imagery.

One advantage of the invention is that it allows the user to easily adjust the display and locate the image easily and efficiently.

Another advantage of the invention is that it uses easy to fabricate optics which eliminate any noticeable aberrations.

Another advantage of the invention is that it uses optics with only two radii of curvature to reduce or eliminate aberrations.

One feature of the invention is that it utilizes carefully located adjustments or pivots which enable the wearer to move the display conveniently without altering the viewed imagery.

Another feature of the invention is that it includes two pairs of pivots.

Another feature of the invention is that it has an adjustable head band.

Another feature of the invention is that it has a sliding mechanism which enables a user to translate the image towards and away from the eyes.

Another feature of the invention is that its optics use lenses only two radii of curvature.

The above and other objects, advantages and features accomplished by the provision of a head-mounted display system for a wearer, including: a display means for displaying a visual image; supporting means to be worn on the head of the wearer for supporting the display means; and mechanical coupling means for mechanically coupling the display means and the supporting means, the coupling means allowing the display means to be positioned within or outside a wearer's primary field of view and yet always directing the visual image into the wearer's pupils.

The display means in the above system includes a pair of groups of lenses, each group of lenses having two positively powered lenses and two negatively powered lenses all having a total of two radii of curvatures and one of the two radii of curvatures is approximately four times the other one of the two radii of curvature. The two positively powered lenses are comprised of acrylic and the two negatively powered lenses are comprised of styrene.

The above and other objects, advantages and features further accomplished by the provision of a head mounted display system for a wearer, including: a supporting means having a first pivot pair; an adjustable arm pair having a first pivot pair end and a second pivot pair, the first pivot pair end of the adjustable arm pair being coupled to the first pivot pair of the supporting means; a display module for respectively outputting a visual image, the display module being attached to the second pivot pair of the adjustable arm pair, wherein the adjustable arm pair can be rotated about the second pivot pair to allow the wearer to position the display module within or outside the wearer's primary field of view.

The above and other objects, advantages and features further accomplished by the provision of a head-mounted display system for a wearer, comprising: a headband having a left pivot and a right pivot; left and right adjustable arms each having a pivot end and a housing end, the pivot end of the left adjustable arm being coupled to the left pivot and the pivot end of the right adjustable arm being coupled to the right pivot; a housing having a left side and a right side, the left side of the housing being attached to the housing end of the left adjustable arm and the right side of the housing being attached to the housing end of the right adjustable arm, wherein the left and right adjustable arms are arranged approximately parallel to each other; left and right display devices arranged in the housing for respectively outputting a left and right visual image; left and right fold mirrors arranged at an acute angle with respect to the left and right display devices in the housing for redirecting the left and right visual images toward the wearer, respectively; and left and right lens assemblies arranged in the housing for magnifying the left and right visual images yielding left and right magnified images, respectively, wherein the housing can be adjustably rotated about the left and right pivot to simultaneously provide the wearer with a lower unobstructed view and an upper view of the left and right visual image.

In the preferred embodiment the entire head-mounted display system is located on the head of the user with a headband or similar device. The display module, which represents the image forming electronics and optics which projects collimated or near collimated light from the display device into the eyes, can be adjusted or moved in three independent ways. The first adjustment is a pivot located approximately above the right and left ear of the wearer. This allows the unit to be rotated in a vertical direction so as to position it in the most comfortable position for viewing. The second adjustment is another pivot located in close proximity to the pupils of the right and left eyes. If the wearer rotates the unit upward or downward about these pivots, the viewed imagery will remain projected into the eyes at all rotation positions. The final adjustment is in the forward or aft direction with respect to the wearer's head, and this allows for the accommodation of eye glasses.

With the three adjustments described above, any user, regardless of head size or shape and regardless of whether or not he or she is wearing eye glasses, can arrange the display viewing module so as to be able to comfortably view the imagery. And further, by adjusting the video display unit about the pivot located in close proximity to the eyes, the video display module can be easily positioned higher or lower so as to permit the wearer to view an area or region separate of the display module. Thus with the preferred embodiment, a user can work at a desk or perform any other form of work or task using their normal vision, and by arranging the video display module outside of their primary visual field of view, he or she can simply look upward to see the displayed video image.

These and other objects, advantages and features will become more apparent from the following description of embodiments thereof taken in conjunction with the accompanying drawings.

DETAILED DESCRIPTION OF THE PREFERRED EMBODIMENTS

A light weight head-mounted display system will now be discussed which provides a wearer with multiple adjustments so as to allow the display module to be located and repositioned to any convenient location within or outside the wearer's primary visual field of view rapidly and conveniently.

Figure 1:
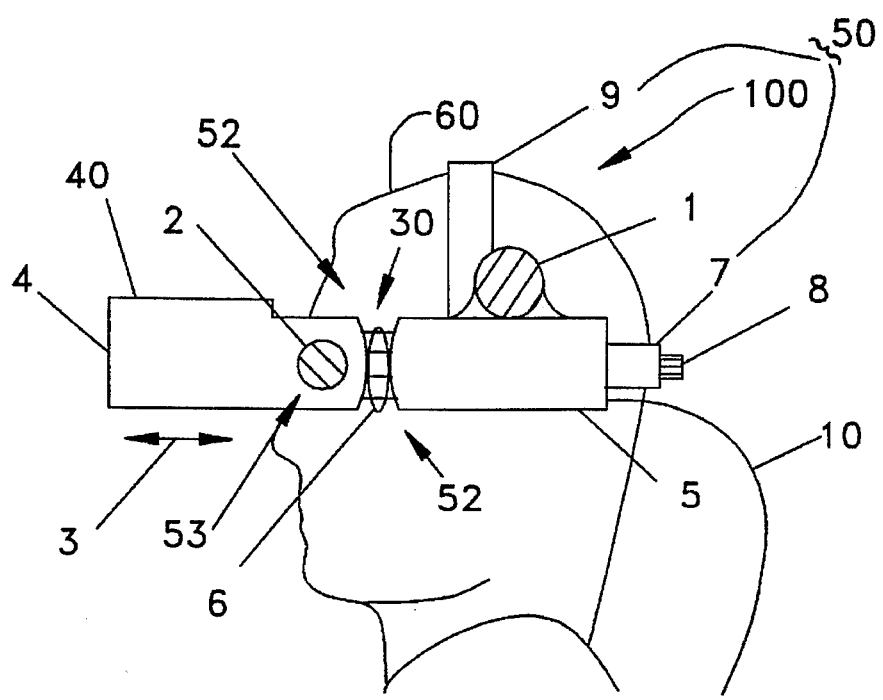
FIG. 1 is a side view of an embodiment of the invention with a display module being viewed directly in front of a wearer.

Referring to FIG. 1, a preferred embodiment of head display system 100 is shown with display module 4 (or housing with optics and electronics) having a display 54 (see FIG. 6) worn on head 60 of a user using a headband 50 with side headband member (closed band) 7 and top headband member (open band) 9. Any other method of supporting system 100 on head 60 such as a helmet, a hat, or any other supporting means can be used in place of headband 50. A means of tightening system 100 on head 60 is provided by a knob 8. A cable 10 provides video and if desired audio signals to system 100 from a remote source (not shown). In alternate configurations, audio and video signals can be transmitted to system 100 using a wireless link.

First pivot pair 1 permits system 100, with the exception of headband 50 which is stationary, to be rotated to an acute angle with respect to the line of sight (the center of the primary field of view) of the wearer about a location approximately above the ears of the wearer. The primary field of view is the field of view the wearer has when looking straight out. The wearer can also, if desired, lengthen or shorten top headband member 9 to assist in locating display module 4 in front of the eyes of the wearer via sliding mechanism 30. Module 4 is mounted on sliding mechanism 30 and can be translated towards and away from head 60.

Second pivot pair 2 is located approximately in line with the wearer's eye pupils, one on each side of head 60. Thus display module 4 can now be rotated upward or downward to any desired acute angle with respect to the line of sight of the user to allow for viewing downward if desired. Only by placing second pivot pair 2 approximately near the pupils of the wearer's eyes, is it possible for the wearer to rotate module 4 about pivot pair 2 while maintaining an image projected into the wearer's pupils regardless of the angle of rotation and regardless of how far module 4 has been translated toward or away from eyes 12 via sliding mechanism 30. Hence, the wearer need only focus the image one time and can from that point on repeatedly raise and lower module 4 as often as he or she likes.

Display module 4 is attached to headband 50 via left and right adjustable arms 52 (only left adjustable arm is shown). Left and right adjustable arms 52 are coupled to first pivot pair 1 at left and right pivot ends 54, respectively. Left and right adjustable arms 52 are attached to second pivot pair 2 at left and right display ends 53.

Pivots 1 and 2 are constructed using a bearing with enough friction to keep display module 4 stationary while allowing module 4 to be easily moved as desired. Pivots 1 and 2 can be locked in place if desired using any standard locking method.

By using two pivots together (pivots 1 and 2), display module 4 can be moved to nearly any desired position ranging from directly in front of the wearer, i.e., within the wearer's primary field of view, to a position where the wearer must look upward at a steep angle to see the displayed imagery. With display module 4 located directly in front of the wearer's eyes, display module 4 will be located in the wearer's primary field of view which is useful in many applications such as virtual reality, viewing movies or other video, and other applications demanding full attention of the wearer. With display module 4 located in an upward location, the wearer can work with his or her primary field of view and then look upward to see the displayed image from display module 4.

Figure 2:
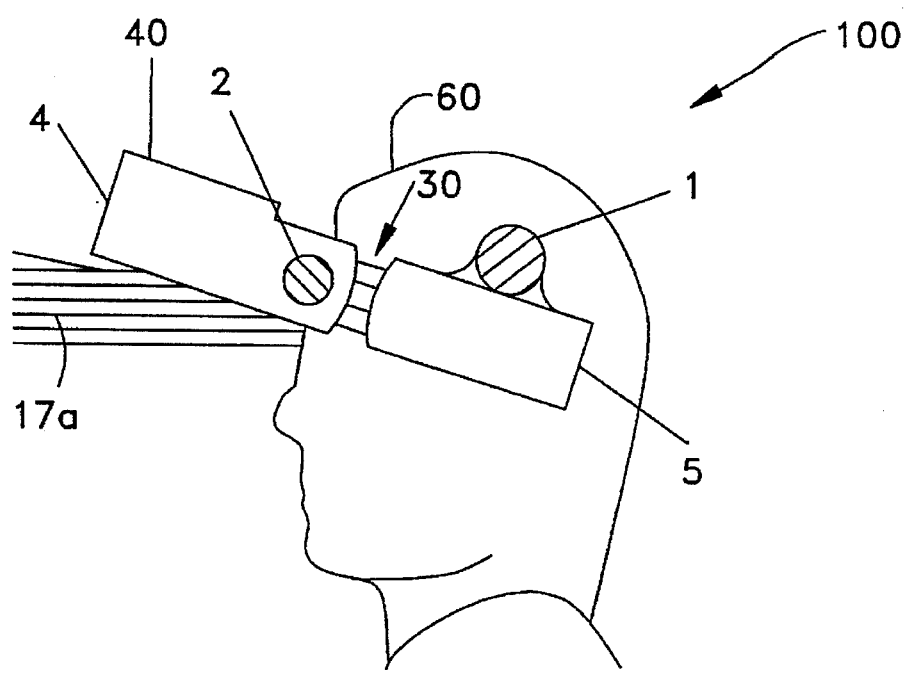
FIG. 2 is a side view of an embodiment of the invention with the display module pivoted upward about a first pivot pair in close proximity to the ears of the wearer.

FIG. 2 shows display module 4 rotated upward about pivot 1. As can be seen, a region 17a is exposed to wearer.

Figure 3:
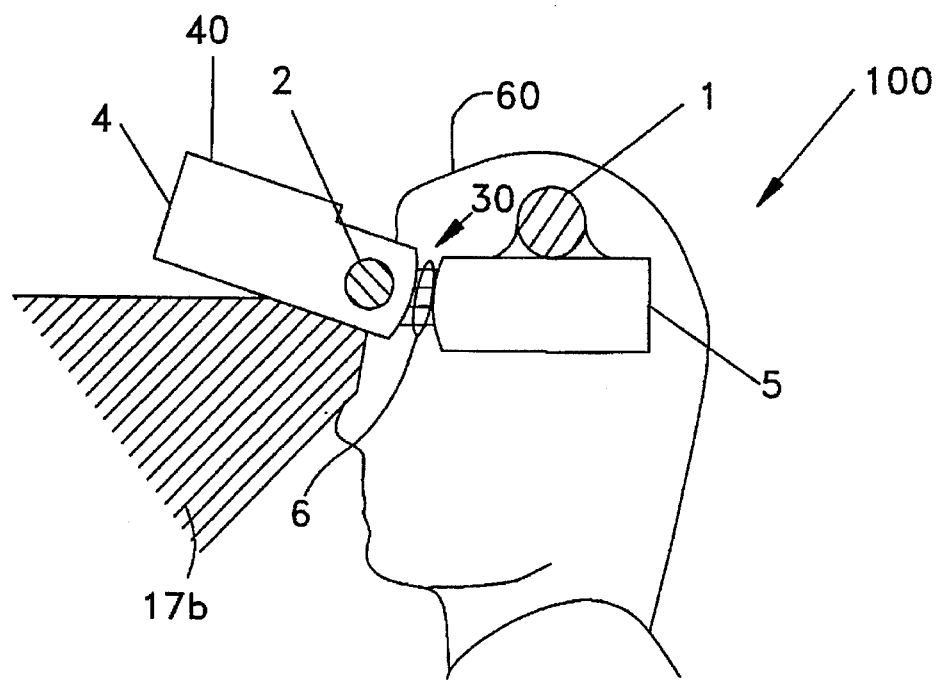
FIG. 3 is a side view of an embodiment of the invention with the display module pivoted upward about a second pivot pair near the eye pupils of the wearer.

FIG. 3 shows display module 4 rotated upward about pivot 2. As can be seen, a region 17b is exposed to wearer.

Figure 4:
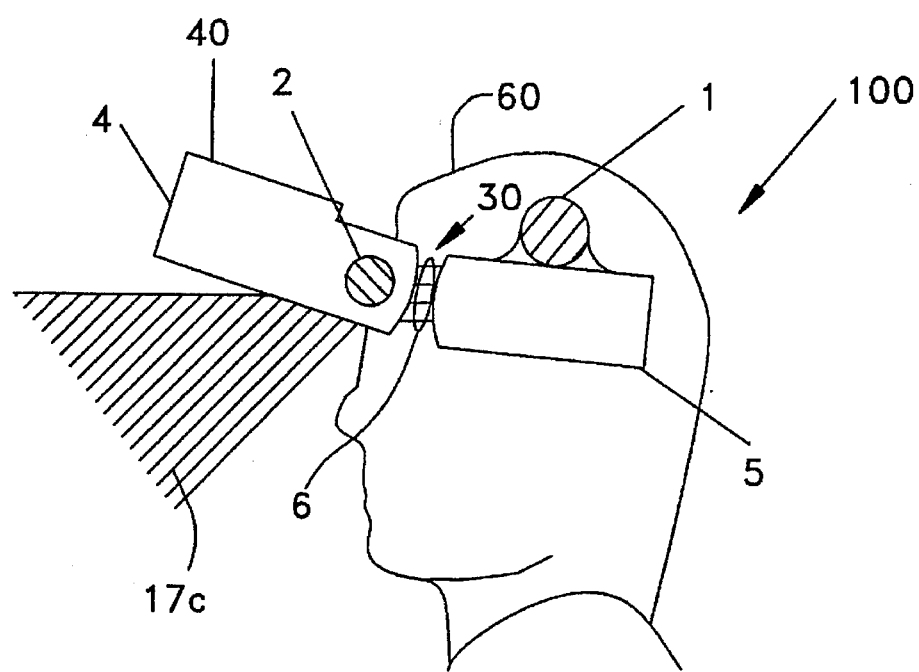
FIG. 4 is a side view of an embodiment of the invention with the display module pivoted upward about both the first pivot pair over the ears of the wearer and also the second pivot pair near the eye pupils of the wearer.

FIG. 4 shows system 100 with display module 4 rotated upward about both pivots 1 and 2. With display module 4 positioned as shown, the wearer can view display 54 by looking upward or alternatively view his or her work or task at hand by looking downward. Region 17c can be viewed comfortably and unobstructed at any time, and by simply looking upward into display module 4, the displayed imagery can be viewed.

Figure 5:
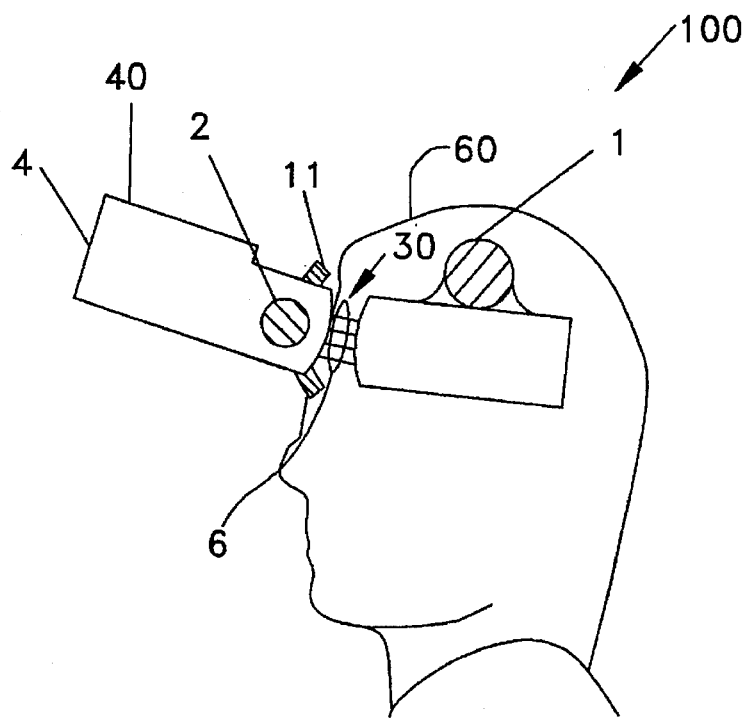
FIG. 5 is a side view of an embodiment of the invention with the display module pivoted upward about both the first pivot pair over the ears of the wearer and also the second pivot pair near the eye pupils of the wearer, and also the display unit extended outward via a sliding mechanism to allow for the use of eye glasses.

FIG. 5 shows system 100 in a position similar to that shown in FIG. 4, except that display module 4 is translated out via sliding mechanism 30 from head 60 to accommodate users with eye glasses. This is accomplished by using sliding mechanism 30 consisting of a slotted piece 6 which can be moved forward or aft from support 5.

Figure 6:
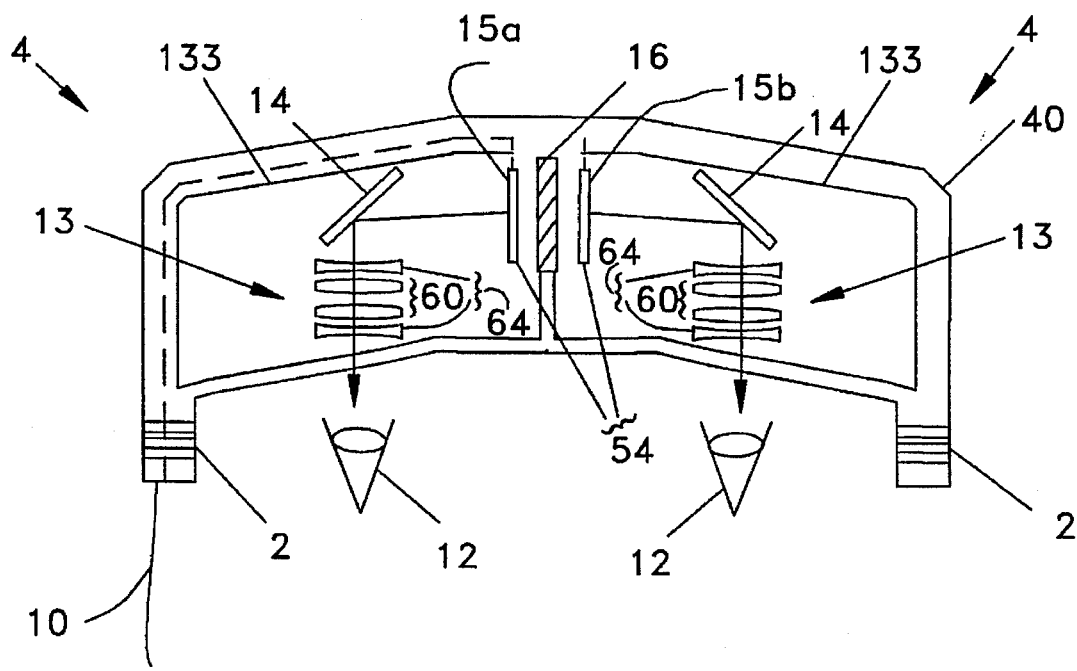
FIG. 6 is a top view of an embodiment of the display module showing viewing optics, fold mirrors, display devices, and a single back light.

FIG. 6 shows a top view of display module 4 with display 54 made up of left display 15a and right display 15b from back light 16. In the preferred embodiment, the wearer's eyes 12 are viewing into viewing or image forming optics 13 (each being a group of lenses). Lenses in the preferred embodiment comprise two elements each element comprising two lenses, two positively powered lenses constitute positively powered element 60 and two negatively powered lenses constitute negatively powered element. 64. Light from left and right displays 15a and 15b is then folded by mirrors 14 towards eyes 12. Displays 15 are either liquid crystal displays (LCDs) or any other form of video or other display means. In cases where self emissive displays (such as miniature CRT displays) or reflective display devices are used, alternate forms of the interior layout within the display module can be implemented.

The configuration used in display module 4 allows for a single back light device to be used which conserves power and reduces the weight and packaging. The invention is not limited to this configuration, and two individual back lights can be used.

As discussed above, head-mounted display system 100 can be arranged on head 60 of the user with a headband or any other similar mechanism. Display module 4 with its image forming electronics and optics, projects collimated or near collimated light from displays 15a and 15b into eyes 12, and can be adjusted or moved in three independent ways. The first adjustment mechanism is first pivot pair 1 located approximately above the right and left ear of the wearer. This allows display module 4 to be rotated in a vertical direction so as to position it in the most comfortable position for viewing. The second adjustment mechanism is second pivot pair 2 located in close proximity to the pupils of right and left eyes 12. If the wearer rotates display module 4 upward or downward about these pivots, the viewed image will remain sharp and projected into the eyes at all rotation positions. The final adjustment mechanism is sliding mechanism 30 which allows a wearer to adjust display module 4 in the forward or aft direction with respect to head 60, and this allows for the accommodation of eye glasses.

With the three adjustments described above, any user, regardless of head size or shape and regardless of whether or not he or she is wearing eye glasses, can arrange display viewing module 4 so as to be able to comfortably view the imagery. And further, by adjusting video display unit 4 about pivot pair 2 (the pivots located in close proximity to the eyes), video display module 4 can be easily positioned higher or lower so as to permit the wearer to view an area or region separate of display module 4 (see FIG. 3). Hence, a user can work at a desk or perform any other form of work or task using their normal vision, and by arranging video display module 4 outside of their primary visual field of view, he or she can simply look upward to see the displayed video image. Only by having multiple pivot pairs with first pivot pair 1 located in the vicinity of the ears and second pivot pair 2 located approximately in the temple region of head 60, is it possible to adjust display module 4 in such a manner that the wearer has a view of region 17a (rotation about pivot pair 1 as in FIG. 2) and also a view of region 17b (rotation about pivot pair 2 as in FIG. 3) while maintaining a clear image (i.e., without requiring the wearer to refocus) with an unobstructed view (i.e., transferring the image into the pupils of the wearer's eyes 12) regardless of how the user arranges module 4 about pivot pair 2.

The optics used to transfer the imagery into the wearer's eyes is of a unique lens design form employing two fully symmetrical air spaced plastic lenses wherein only two different radii of curvature are required in order to correct residual aberrations and achieve a high level of optical performance.

Lenses comprising image forming optics 13 can be manufactured using an injection molding process or similar manufacturing method, the materials must be a polymer or plastic. These materials cannot be cemented. By using a small air space between each of the doublet groups, the aberrations can be removed using only two different radii of curvature. Image forming optics 13 will now be discussed in more detail.

Figure 7:
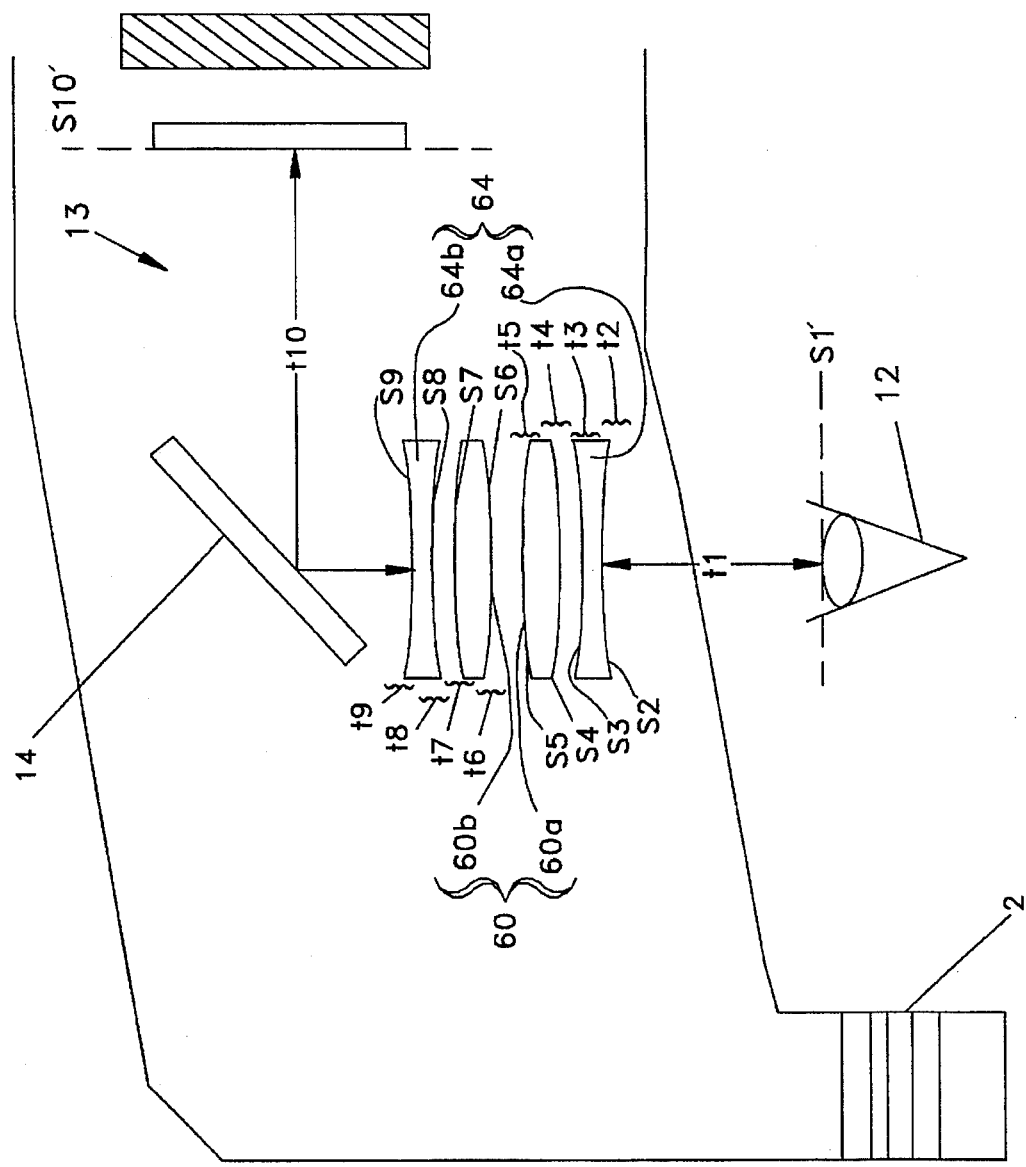
FIG. 7 shows a more detailed view of the image forming optics in FIG. 6.

FIG. 7 shows a more detailed view of image forming optics 13. In a preferred embodiment, design parameters for image forming optics 13 are shown in Table 1. These design parameters can vary by plus or minus approximately 15% and preferably approximately a few percentage points and still provide images with little to no discernible aberrations. In addition, the parameters are in relative units of length which can be scaled accordingly. In a preferred embodiment the units are in millimeters.

TABLE 1

| Surface # | Radius | Thickness | Material |
|---|---|---|---|
| S1' | infinity | t1 = 34.0 | air |
| S2 | 168.82564 | t2 = 2.0 | styrene |
| S3 | 39.37732 | t3 = 0.25 | air |
| S4 | 39.37732 | t4 = 5.317597 | acrylic |
| S5 | −39.37732 | t5 = 0.5 | air |
| S6 | 39.37732 | t6 = 5.317597 | acrylic |
| S7 | −39.37732 | t7 = 0.25 | air |
| S8 | −39.37732 | t8 = 2.0 | styrene |
| S9 | −168.82564 | t9 = 32.003314 | air |
| S10' | infinity | | |

Positively powered element 60 is made of first and second positively powered lenses 60a and 60b, respectively. First positively powered lens 60a has surface S4 with radius r4 and thickness t4, and surface S5 with radius r5 and thickness t5 and is made of acrylic. Second positively powered lens 60b is identical to first positively powered lens 60a. Namely, second positively powered lens 60b has surface S6 with radius r6 and thickness t6, and surface S7 with radius r7 and thickness t7 and is also made of acrylic.

Negatively powered element 64 is made of first and second negatively powered lenses 64a and 64b, respectively. First negatively powered lens 64a has surface S2 with radius r2 and thickness t2, and surface S3 with radius r3 and thickness t3 and is made of styrene. Second negatively powered lens 64b is identical to first negatively powered lens 64a. Namely, second negatively powered lens 64b has surface S8 with radius r8 and thickness t8, and surface S9 with radius r9 and thickness t9 and is also made of styrene.

Distance t1 is the distance from an imaginary plane (S1') at the pupil of the eye and distance t10 is the distance from surface S9 to display element 15a. The optics in the right portion of module 4 are identical to the optics discussed above with respect to the left portion of module 4.

Numerous and additional modifications and variations of the present invention are possible in light of the above teachings. It is therefore to be understood that within the scope of the appended claims, the invention may be practiced otherwise as specifically claimed.

What is claimed is:

1. A head-mounted display system for a wearer, comprising:

display means for displaying a visual image, wherein said display means comprises a pair of groups of lenses, each group of lenses having two positively powered lenses and two negatively powered lenses all having a total of two radii of curvatures, and wherein one of said two radii of curvatures is approximately four times the other one of said two radii of curvatures;

supporting means to be worn on the head of the wearer for supporting said display means; and mechanical coupling means for mechanically coupling said display means and said supporting means, said coupling means allowing said display means to be positioned within or outside a wearer's primary field of view and yet always directing said visual image into the wearer's pupils.

2. The head-mounted display as claimed in claim 1, wherein said two positively powered lenses comprise acrylic and said two negatively powered lenses comprise styrene.

3. The head-mounted display as claimed in claim 1, wherein said positively powered lenses have one of said two radii of curvature.

4. A head-mounted display system for a wearer, comprising:

supporting means having a first pivot pair;

an adjustable arm pair having a first pivot pair end and a second pivot pair, said first pivot pair end of the adjustable arm pair being coupled to said first pivot pair of said supporting means; and a display module for respectively outputting a visual image, said display module being attached to said second pivot pair of said adjustable arm pair, wherein said adjustable arm pair can be rotated about said second pivot pair to allow the wearer to position said display module within or outside the wearer's primary field of view, wherein said display module comprises a pair of groups of lenses, each group of lenses having only two radii of curvature, and wherein one of said two radii of curvature is approximately four times the other one of said two radii of curvature.

5. The head-mounted display as claimed in claim 4, wherein each group of lenses has two positively powered lenses comprised of acrylic and two negatively powered lenses comprised of styrene.

6. The head-mounted display as claimed in claim 4, wherein some lenses of said pair of groups of lenses are comprised of acrylic and other lenses of said pair of groups of lenses are comprised of styrene.

7. The head-mounted display as claimed in claim 4, wherein each group of lenses has two positively powered lenses and two negatively powered lenses.

* * * * *